C. VON HOFE.
TELEMETER.
APPLICATION FILED AUG. 26, 1909.

1,067,027.

Patented July 8, 1913.

Witnesses:—
Albert B. Doring
D. H. Davies

Inventor
Christian von Hofe
By his attorneys
Dickerson, Brown, Raegener & Maty

UNITED STATES PATENT OFFICE.

CHRISTIAN von HOFE, OF WILMERSDORF, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TELEMETER.

1,067,027. Specification of Letters Patent. Patented July 8, 1913.

Application filed August 26, 1909. Serial No. 514,723.

*To all whom it may concern:*

Be it known that I, CHRISTIAN VON HOFE, a citizen of the German Empire, and resident of Wilmersdorf, near Berlin, Germany, doctor of philosophy, have invented certain new and useful Improvements in Telemeters, of which the following is a specification.

My invention relates to telemeters which are provided with devices for producing two sets of images of objects aimed at in the field of view in such relation to each other that the one set appears above and the other set below a horizontal boundary line or line of division; the training of the instrument on a special object being effected by bringing the two images on opposite sides of the line of division into a prescribed relation with each other. In the various embodiments of instruments of this kind the images on opposite sides of the boundary line are either alike but one inverted upon the other such telemeters being called inversion telemeters or two complementary images are united by the adjustment, this being true for so called coincidence telemeters.

In order to secure conveniency and accuracy of adjustment the boundary line is in accordance with this invention so positioned that it traverses the field of view but divides the same into two sections of unequal sizes. If the line is not excessively removed from the center the reduction of its length is only very small, whereas the comparatively slight displacement adds considerably to the area of the section of field on one side of the line. This non-symmetrical arrangement is of advantage both in inversion telemeters and in coincidence telemeters. In the case of the former the objective field of view is in effect enlarged, the images at both sides of the line being the same. In the case of coincidence instruments the unsymmetrical arrangement does not affect the actual size of the objective field of view, different objects being shown at opposite sides of the line. Nevertheless, the enlargement of one section of the field places a larger field at the operator's disposal, since the complementary images only make a composite image when the instrument is directly trained thereon; on the right and left of these particular objects the part-images above and below the line do not make a composite image.

Figure 1:
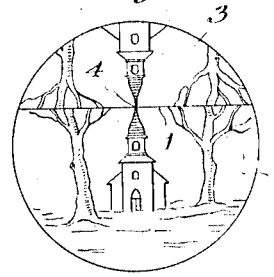
Figure 2:
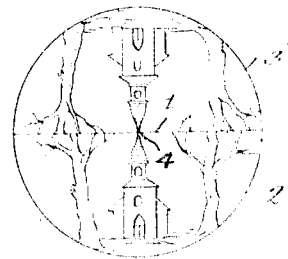
Figure 5:
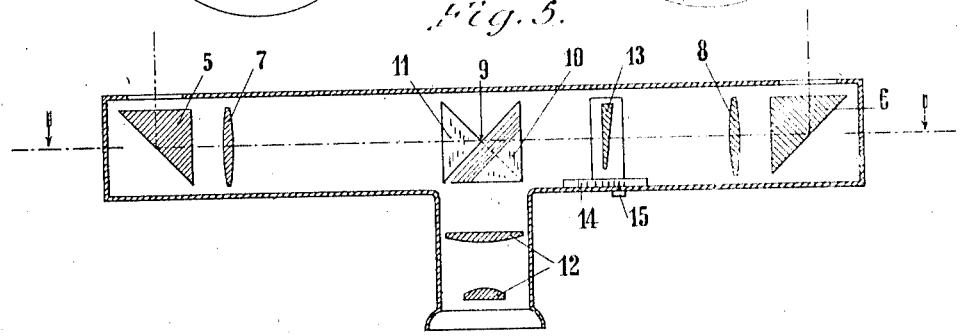
Figure 6:
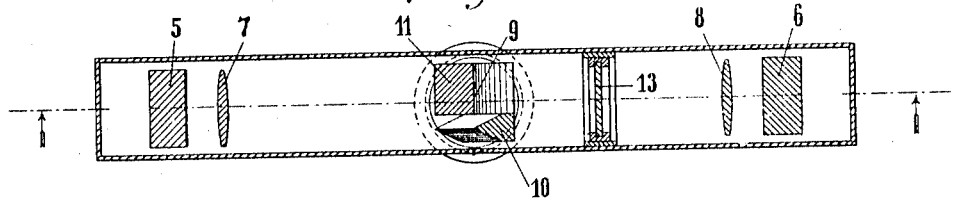
Figure 3:
Figure 4:

The invention is illustrated in Figures 1 and 4 of the annexed drawing, Fig. 1 being a diagram showing the non-symmetrical arrangement of the boundary line in the image-field of an inversion telemeter. Figs. 2 and 3 are diagrams illustrating previous arrangements in inversion instruments old in the art. Fig. 4 is a diagram of the image-field of a coincidence instrument with non-symmetrical boundary line. Figs. 5 and 6 show two central sections through an inversion telemeter according to the invention, the sections being taken at right angles to each other.

Like reference numerals denote like or equivalent parts in all the figures.

Referring to Fig. 1, 1 represents the boundary line, 2 the larger field-section, and 3 the smaller section. In the smaller section only a portion of the object seen in the larger section is visible, but sufficient for the purpose of adjusting the instrument by bringing the steeples into line at 4. The large section 2 gives a convenient range of view.

In Fig. 2, illustrating a previously known arrangement, it will be seen that the range of landscape visible is considerably reduced, without any compensating advantage with regard to facility of adjustment.

In Fig. 3, illustrating another known arrangement, the boundary line does not traverse the field but incloses a small central section of the field. The increased size of the section 2 is here of no advantage, the field being non-continuous. Adjustment is, moreover, rendered more or less difficult, more particularly in the case of moving objects, owing to the restricted length of the boundary line 1.

In the arrangement shown in Fig. 4, the instrument, a coincidence telemeter, is adjusted to bring the flagstaff in line with the steeple at 4. In this case again the advantage of the increased size of 2 is obvious, while there is no drawback by reason of the reduced size of 3.

Figs. 5 and 6 show diagrammatically an embodiment of an inversion telemeter according to the invention. In this embodiment of a telemeter there are arranged at the end points of a base, prisms 5 and 6 which reflect the rays entering them toward the objectives 7, 8 from which they pass to the image-uniting body 9, which in the example shown consists of two crossed prisms 10 and 11, the former of which being provided with a roof edge. The ocular of the instrument is marked 12; 13 is a wedge shaped adjustable compensating device to secure coincidence of the images, 14 a scale on which the distance of objects is read the images of which are brought to coincidence by the compensating device and 15 a pointer connected to the compensating device and movable on scale 14. The contacting planes of the prisms 10, 11 form the horizontal boundary line in the field of view of the instrument. This horizontal boundary line traverses the image field in the whole of its width and divides it into two sections of unequal size as shown in Fig. 1, where in the lower section an upright partial image and in the upper section an inverted partial image are seen, said partial images being adapted to be brought to coincidence as illustrated with regard to the church steeple at 4 in Fig. 1 of the drawing.

What I claim is:

1. A telemeter having a horizontal boundary line in the field of view of the instrument arranged in such a manner that it traverses the image field in the whole of the width and divides same into two sections of unequal size, said telemeter provided with optical means adapted to produce two sets of images of distant objects, one set in each section of the image field, the two sets of images contacting with each other with their upper and lower extremities respectively in said horizontal boundary line.

2. An inversion telemeter showing a boundary line in the image-field, traversing same for its entire width, and dividing it into two sections of unequal size.

In testimony whereof I have signed this specification in the presence of two subscribing witnesses.

CHRISTIAN von HOFE.

Witnesses:
 FERDINAND ROHWEDDLER,
 BRUNO GOSCZ.